United States Patent [19]

Lindblom

[11] Patent Number: 5,312,209
[45] Date of Patent: May 17, 1994

[54] DRILL
[75] Inventor: Stefan Lindblom, Gavle, Sweden
[73] Assignee: Sandvik, AB, Sweden
[21] Appl. No.: 988,793
[22] Filed: Dec. 10, 1992
[30] Foreign Application Priority Data Dec. 16, 1991 [SE] Sweden .................. 9103713-5

[51] Int. Cl.⁵ .................................... B23B 51/02
[52] U.S. Cl. .............................. 408/230; 408/227
[58] Field of Search ................ 408/227, 229, 230

[56] References Cited

U.S. PATENT DOCUMENTS

| 390,672 | 10/1888 | Holmes | 408/230 |
|---|---|---|---|
| 472,541 | 4/1892 | Johnson | 408/230 |
| 750,537 | 1/1904 | Hanson | 408/230 |
| 2,936,658 | 5/1960 | Riley | 408/230 |
| 4,222,690 | 9/1980 | Hosoi | 408/230 |
| 4,950,108 | 8/1990 | Roos | 408/230 |

FOREIGN PATENT DOCUMENTS

| 1477719 | 5/1969 | Fed. Rep. of Germany . |
|---|---|---|
| 2459286 | 6/1976 | Fed. Rep. of Germany . |
| 3826239 | 2/1990 | Fed. Rep. of Germany ...... 408/230 |
| 1055570 | 2/1954 | France . |
| 2190031 | 1/1974 | France . |
| 63-260713 | 5/1969 | Japan . |
| 55-106710 | 8/1980 | Japan .................. 408/230 |
| 60-177807 | 9/1985 | Japan .................. 408/230 |
| 61-192408 | 8/1986 | Japan . |
| WO89/02328 | 3/1989 | PCT Int'l Appl. . |
| 665979 | 6/1988 | Switzerland . |
| 2010708 | 7/1979 | United Kingdom . |

Primary Examiner—Daniel W. Howell
Attorney, Agent, or Firm—Burns, Doane, Swecker & Mathis

[57] ABSTRACT

A drill comprising a solid shank with a first, tip-forming end having cutting edges on opposite second end and a number of flutes corresponding to the number of cutting edges. The flutes extend from the tip end towards the other end and have the purpose of forming and conveying chips from the corresponding cutting edge. At a predetermined distance from the tip, each individual flute turns from a first, chip-forming zone with a predetermined width or cross-sectional area into a second, merely chip-conveying zone with a larger width or cross-sectional area. After having been formed in the first zone, the chips are given the possibility of dilating in the second zone, in order to facilitate chip conveyance.

19 Claims, 3 Drawing Sheets

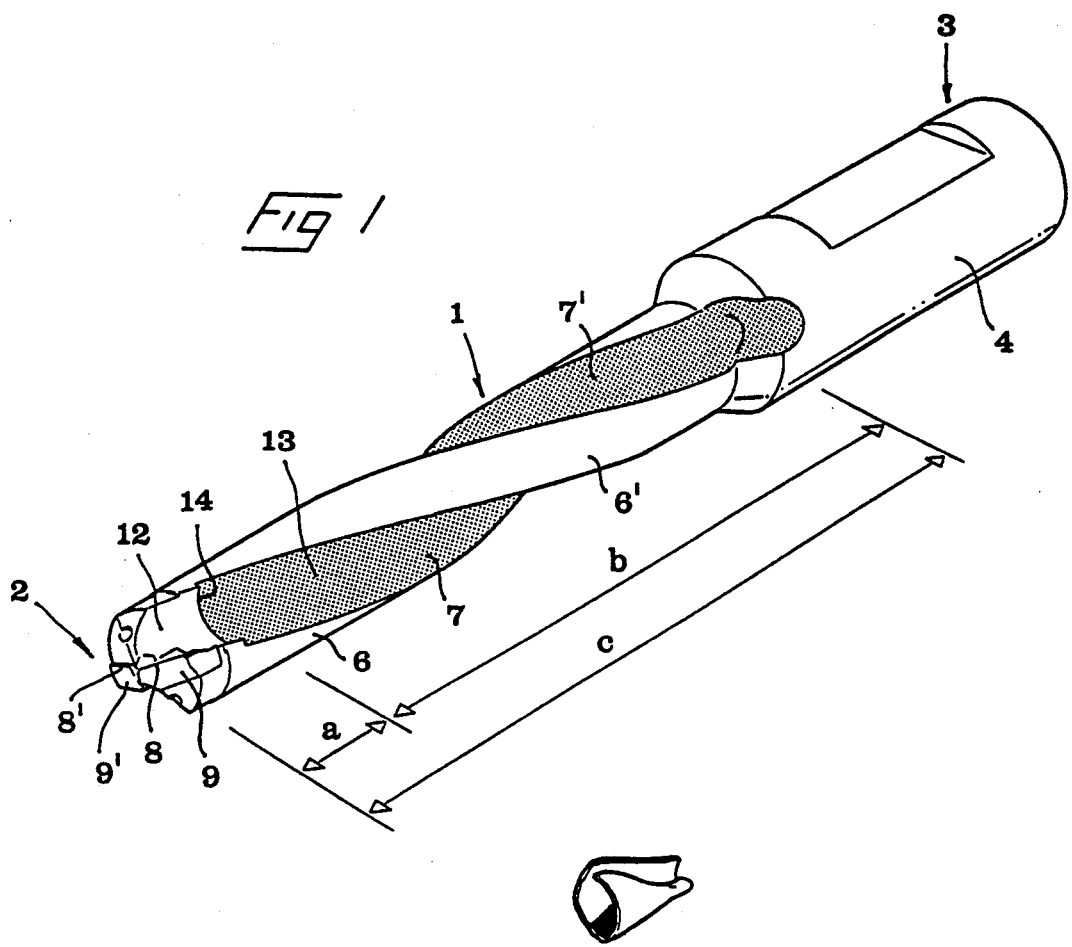

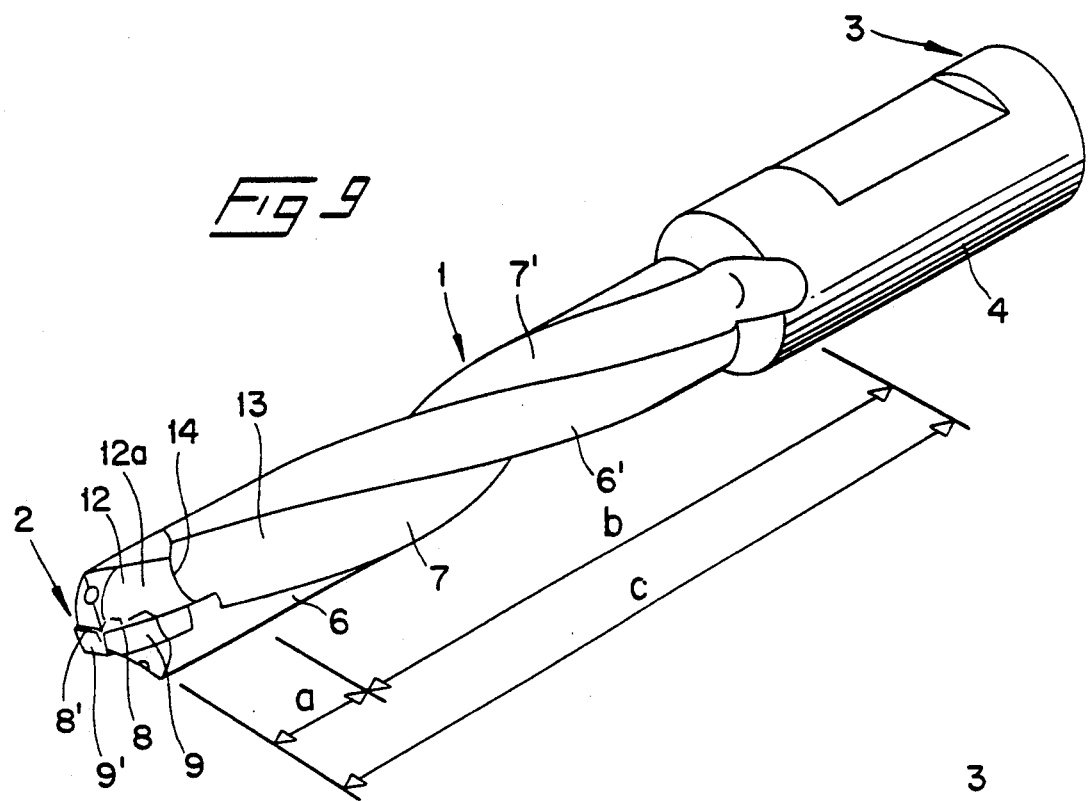
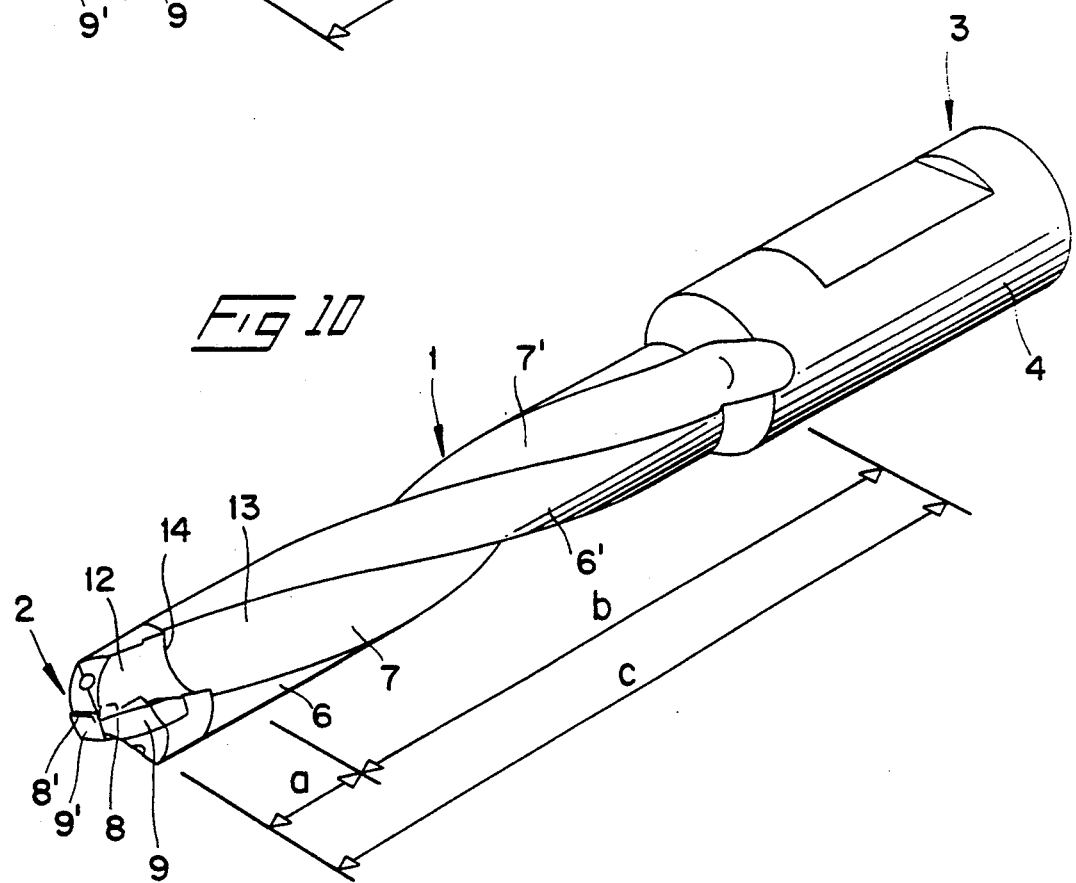

DRILL

FIELD OF THE INVENTION

The present invention relates to a drill comprising a substantially solid shank with a first tip-forming end including one or several cutting edges for cutting machining of preferably metallic workpieces in order to make holes in these, an opposite second end, and a number of flutes corresponding to the number of cutting edges, extending from the tip end towards the other end, having the purpose of forming and removing chips from the corresponding cutting edge.

DESCRIPTION OF THE PRIOR ART

The flutes of, e.g., a twist drill, have two important functions, viz. on the one hand the forming of chips (including chipbreaking) and on the other hand the removal of these formed chips. The chip formation occurs in a space immediately behind each cutting edge, regardless of whether the edge is formed by a sharpening of the drill top as such, or by a separate cutting insert which is fastened on the tip by, e.g., brazing. In this front space of a flute, the initially bandlike material that is separated off by the cutting edge from a workpiece, is forced to curl and break, thus creating separate chips with a particular form and size. Under ideal circumstances, which are determined by several different factors, like the material properties of the workpiece, cutting geometry, the diameter of the drill, the form and relative dimensions of the chip-forming space, etc., chips of limited length are produced which are specifically formed by the geometry, for instance conical or bell-like chips. Particularly the form and the size of the chip-forming space in each flute have great importance in order to achieve a form and a size of the chips that make them easily conveyable.

After having been formed and broken, the chip possesses an inherent elasticity that varies from material to material, but which always implies a striving of the chip to dilate by elastic deformation, thereby exerting a more or less strong pressure upon the flute walls and also against the walls of the hole being drilled in the workpiece. In conventional prior art drills, the chip-conveying flutes normally have one and the same width along their entire longitudinal extension. This implies that the pressure of the chip against the hole wall remains substantially equal along the entire length of the flute. If this pressure is sufficiently high, the total friction force of many chips can cause chip jamming with considerable inconveniences as a consequence. Even if occurring, chip jamming does not necessarily cause a tool breakdown, it can anyway severely disturb the chip-forming. Instead of getting an ideal form, the chips will get folded and will stiffen, thereby forming long, bandiron-like configurations which are difficult to convey. Such chip jamming thus severely complicates the conveyance of the chips and sometimes the friction between the chips and the hole wall can result in an extremely high generation of heat and in an uneven hole surface. An extraordinary high friction naturally also leads to the drill being forced to work with a high turning resistance.

The above mentioned inconveniences are of course specially pronounced for longhole drills (i.e., drills whose length are 8 to 10 times or more longer than their diameters), which sometimes can have very long chip-conveying flutes, in which the total pressure of all the chips that have been pressed together is extraordinarily high.

OBJECTS AND SUMMARY OF THE INVENTION

The present invention aims at eliminating or reducing the above related inconveniences of known drills. Thus, a primary object of the invention is to provide a drill with improved chip-conveying ability in comparison with conventional drills. Another object is to bring about this improved chip-conveying ability by simple means and by minimal economical contribution.

The above-mentioned objects and others are achieved with a drill in accordance with the present invention. By dividing the individual chip-conveying flute in accordance with the present invention, into, on the one hand, a pronounced chip-forming zone and, on the other hand, into another zone for only chip conveyance with a larger width than the chip-forming zone, the effect is achieved that the chips can be formed under substantially ideal circumstances in the first zone and immediately thereafter dilate in the following conveying zone with a great decrease of the friction between the chips and the hole wall. In practice, the chips will thus be effectively pressed together into typical chips with optimal form in the chip-forming zone, which can have the same optimal form for different drill types as the corresponding conventional drill of the same type, after which the inherent spring force in the chip is liberated in the following conveying zone with enlarged width.

Many attempts have been made in the prior art with the aim to improve the chip-conveying function of drills. E.g., from CH 665,979 and DE 2,459,286 it is known to make the helically formed chip-conveying flutes of twist drills with diminishing twist angle, e.g., with increasing pitch angle, towards the rear end of the drill shank, in order to give the flutes a progressively increasing width from the tip end towards the rear end. However, in this case there is no pronounced chip-forming zone which connects with a recessed or widened conveying zone via a distinct step, but rather a continuous smooth diminution of the twist angle the whole way from the tip of the shank.

Further, in DE 1,477,719 a drill is described with one single, straight chip flute with continuously increasing radial depth from the tip towards a point at a considerable distance from the tip. Nor is there in this case any pronounced chip-forming zone that gives a distinct compressed chip which after forming can dilate in a specific conveying zone with abruptly increasing width.

Also the drills known from U.S. Pat. No. 750,537 and WO89/02328 lack distinct chip-forming and conveying zones with different widths which are connected via a distinct joint.

BRIEF DESCRIPTION OF THE DRAWINGS

Preferred embodiments of the present invention will be described with reference to the accompanying drawings, wherein like members bear like reference numerals, and wherein:

FIG. 1 is a perspective view of a drill according to the present invention;

FIG. 2 is a simplified and amplified perspective view illustrating the general form of an individual chip formed by the drill as shown in FIG. 1;

FIG. 9 is a perspective view of the drill similar to FIG. 1 showing a decreasing width in the chip forming zone; and FIG. 10 is a perspective view of the drill similar to FIG. 1 showing a separate tip part.

DETAILED DESCRIPTION OF PREFERRED EMBODIMENTS OF THE PRESENT INVENTION

Figure 4:
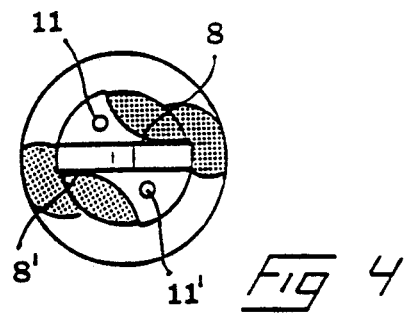
FIG. 4 is an end view of the tip end of the drill.
Figure 5:
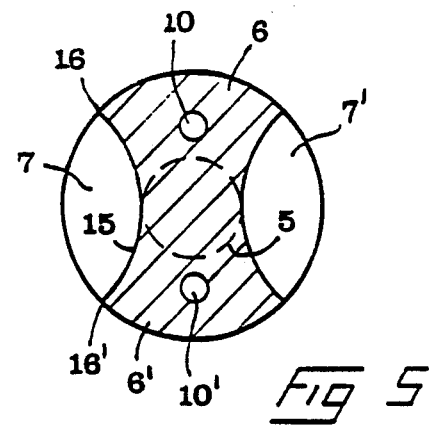
FIG. 5 is an amplified cross-sectional view taken along line V—V in the region of the tip of the drill-shaft.

In the drawings 1 generally designates a solid shank with a first end or tip 2 and an opposite second end 3. At this second, rear end 3 the shank of the shown embodiment has a thicker part 4 suitable for insertion into a holder. From a core 5 (FIGS. 5 and 6), two lands 6, 6' protrude, which delimit two flutes 7, 7'. In the illustrated embodiment the drill is a twist drill on which the lands 6, 6' as well as the flutes 7, 7' extend helically around the longitudinal axis of the shank. In practice, these flutes in known manner have a suitably uniform pitch angle within the range 20°-40°. At the tip 2, two cutting edges 8, 8' are provided, which in this case are formed on special cutting inserts 9, 9' that have been fixed to the tip in a suitable way, for instance by soldering or brazing. The cutting inserts 9, 9' are placed in such a way that they meet at the center of the drill. However, these cutting edges could equally well be formed by grinding of suitably formed surfaces on the shank per se or on a part which is connectable and disconnectable with the shank. It should also be noted that the shank 1 can be provided with one or more ducts 10, 10' (see FIG. 5) which lead to two openings 11, 11' in the proximity of the cutting edges 8, 8'. In a known manner, cooling medium can be fed through these ducts to the drill tip 2. The term "solid shank" as used in the present description and in the following claims has the purpose of distinguishing the drill according to the invention from such drills that include pipe-formed shanks, but does not exclude such shanks which have one or several diminutive ducts for a cooling medium in an otherwise solid body.

FIG. 2 illustrates the appearance of a normally occurring individual chip that has been formed by the drill according to FIG. 1.

According to the present invention, each of the two flutes 7, 7' is divided into, on the one hand, a first, chip-forming zone 12 with a certain predetermined width or cross-sectional area, and on the other hand, a second, merely chip-conveying zone 13 with a larger width or cross-sectional area than the former zone. The connection 14 between these two zones 12, 13 has the form of a distinct step whose depth determines the differences in width between the two zones. In the chip-forming zone, the individual flute 7, 7' in known manner preferably has an arc-like cross-sectional form, for instance the form of a circular arc (see FIG. 5), i.e., it is delimited by an arched, smooth surface 15 that extends between the two limit edges 16, 16' on the two lands 6, 6' between which the flute is delimited. The length a of the chip-forming zone 12, starting from the shank tip 2, should lie within the range 0.3-2.0, suitably 0.5-1.5 or preferably around 0.8 times the shank's diameter. This length in combination with the cross-sectional form of the flute in the zone 12 is established from case to case for different types of drills, depending on, e.g., the drill diameter, the length of the drill, the material properties of the workpieces, etc. All of the factors are considered in aiming at achieving ideal chip-forming in the zone.

According to one embodiment of the invention, each individual flute 7, 7' in its chip-forming zone 12 has substantially one and the same width along the entire extension of said zone, i.e., a line at the bottom of the flute extends steadily on the same distance from the central axis of the shank in this zone (possibly with the exception of a short recess or depression in the flute surface in the immediate proximity of the region of the tip where the two cutting inserts 9, 9' meet). However, according to an alternative embodiment it is also possible to construct the chip-forming zone in such a way that the flute at least in a rear part of this zone has a rearwards gradually decreasing width, whereby in the region of the connection or step 14 a passage is created with minimal width in which the chips will be compressed to an extraordinarily small volume before they are fed into the conveying zone 13 to be dilated. It is possible to achieve an extraordinary compression of the chips in this way because the compression takes place only in a space with a very limited axial extension.

The conveying zone 13, which is widened in relation to the chip-forming zone 12, advantageously extends the whole way from the connection 14 to the rear end of the flute (although it is also feasible to end the zone 13 at certain distance from the rear end of the flute and again let the flute connect to a zone of the same width as the zone 12). In practice, the increase of the flute width in the conveying zone 13 should lie within the range 5-25%, suitably 10-20%, i.e., the cross-sectional area in the conveying zone 13 should be 5-25% or 10-20% larger than the cross-sectional area in the forming zone 12. In this case, the sum of the length a of the zone 12 and the length b of the conveying zone 13 equals the total length c of the flute. According to a preferred embodiment, the flute has one and the same width or cross-sectional area along the whole length b of its conveying zone 13, i.e., the flute has a uniform depth in the conveying zone. However, the widening of the flute in the conveying zone 13 according to the invention takes place at the expense of the stiffness and the strength of the drill shank, since the core 5 of the shank (cf. FIGS. 5 and 6) becomes thinner in the region of the widened chip-conveying zones 13 than in the region of the narrower zone 12. Therefore, in practice the flute depth in the conveying zone 13 is determined by a compromise between, on the one hand, the requirement of stiffness in the shank and, on the other hand, the desire of a possibly roomy chip-conveying space. In view of this, the invention foresees the possibility of making the chip-conveying zone 13 of the flute with a varying cross-sectional area, more specifically in such a way that the flute, at least along a rear part of zone 13, has a gradually decreasing width towards the rear end of the shaft, up to a width that is not smaller than the smallest width of the chip-forming zone 12. Such an embodiment can be realized since the chips are more easily conveyed from the flutes in the region of their rear, open end than in the region closer to the tip, where chips lying behind exert a higher conveying resistance.

As previously mentioned, the zone connection 14 should have the form of a distinct step, after which the flute width abruptly increases in the conveying zone. In practice, this step is suitably achieved by letting a radial shank-end mill, which has been used for forming the conveying zone, be taken out sidewise after performed milling, while leaving a rounded end surface. In this case the axial extension of connection 14 does not become larger than the radial measure of the flute depression. However, it is also feasible to make a connection with a larger axial extension than this.

Figure 6:
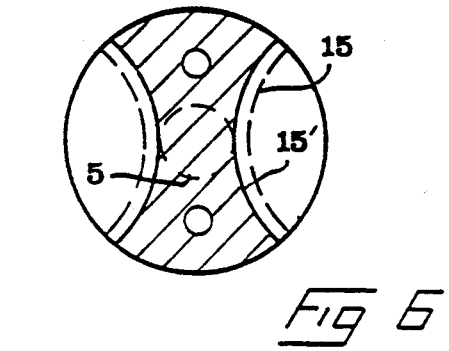
FIG. 6 is an analogous, amplified cross-sectional view taken along line VI—VI through that part of the shank in which the widened chip-forming zone is provided.

In FIG. 6, the bottom 15 of the flute in the forming zone 12 is indicated by broken lines, while the bottom of the flute in the conveying zone 13 is designated 15'. The distance between the continuous and the broken lines represent the measure by which the flute widens in the conveying zone. In the illustrated embodiment, the depression is substantially equally large over the whole width of the flute. However, the invention does not exclude the possibility of widening the flute by either only one depression (while maintaining the same width as in the forming zone 12) or only one widening (while maintaining the same depth as in the forming zone).

Figure 7:
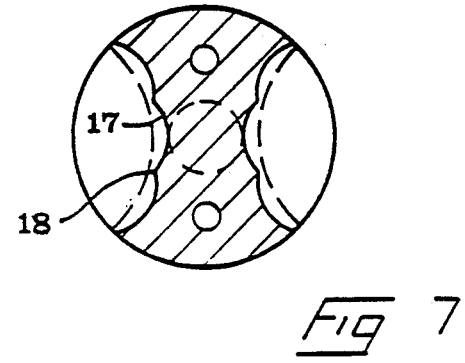
FIG. 7 is a similar cross-sectional view showing an alternative embodiment of the chip-conveying flutes in the conveying zone.

With reference to FIG. 7, an alternative embodiment of the drill is shown, which differs from the embodiment in FIG. 6 in that the individual flute 7, 7' in its chip-conveying zone 13 at least partially is delimited by a bottom or a surface in which are provided longitudinal depressions or grooves 17 between which there are ridges, preferably sharp edged ridges 18, which have the purpose of reducing the contact surfaces between the chips and the flute. In this case, the chip conveyance is thus not only facilitated by the fact that the flute has been widened in its chip-forming zone 13 but also by the sharp ridges 18 which bring about a line contact between chips and the flute bottom, rather than a surface contact as when the flutes have a completely smooth bottom.

Figure 8:
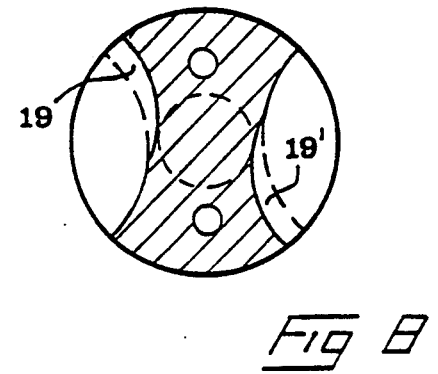
FIG. 8 is a cross-sectional view showing a further alternative form of the flutes in the chip-conveying zone.
Figure 3:
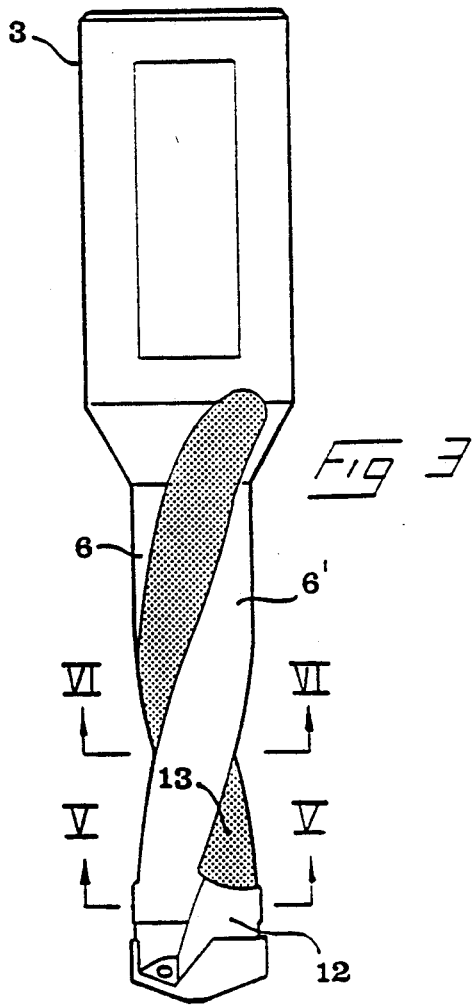
FIG. 3 is a side view of the same drill as in FIG. 1.

With reference to FIG. 8, a further embodiment is shown, according to which each of the two flutes 7, 7' are widened in their conveying zones 13 by providing a longitudinal depression 19, 19' with a smaller width than the flute's total width positioned eccentrically or unsymmetrically in the flute bottom. Such a thin depression may also be positioned centrally in the flute bottom.

Lately, drills have been developed whose shanks are divided into a main part and a tip part 2a (FIG. 10) which is disconnectable from the former and on which the cutting edge(s) is/are positioned, normally in the form of separate cutting inserts which have been soldered or brazed onto the tip part. The present invention can advantageously also by applied on such drills, the connection between the chip-forming zone and the chip-conveying zone in each flute being located to the joint region of the main part and the tip part. Thus, the chip-forming zone is exclusively in the tip part, while the pure chip-conveying zone is in the main part of the shank.

The chips, like in the case of the machining of most metals have an inherent elasticity after having been formed in the first zone 12. With the present invention, these chips are given an opportunity of dilating in the following conveying zone 13. By proceeding in this way, the friction-increasing force is considerably reduced, with which the chips, as a consequence of their elasticity, tend to press against the walls of the flutes, as well as the walls of the hole which is being drilled in the actual workpiece. This reduction in the friction force results in a radical decrease of the chip-conveying resistance and simultaneous diminution of heat generation. Also the turn resistance is reduced and smoother hole surfaces are obtained.

Obviously the invention is not restricted solely to the embodiments as described and shown on the drawings and described above. It is also possible to apply the invention on other drills than twist drills and twist drills with two chip-conveying flutes. Thus, the inventive concept can also be applied on drills with straight chip-conveying flutes. Nor is the realization of the invention depended upon the number of flutes in each drill. Hence, the chip conveyance can be improved in the described way independently of whether the shank comprises one or more flutes.

What is claimed is:

1. Drill comprising a substantially solid shank with a first, tip-forming end having one or more cutting edges for cutting or machining of workpieces for making holes in the workpieces, an opposite second end of the shank and a number of flutes corresponding to the number of cutting edges, said flutes extending from the tip end towards the other end, said flutes being provided for forming and conveying chips from the corresponding cutting edge, said flutes having a first, chip-forming zone extending for a predetermined length from the first end and having one of a predetermined width or cross-sectional area, a second, chip-conveying zone with one of a larger width or cross-sectional area than the first zone, the connection between the first and second zones being a distinct step, the chips after being formed in the first zone being capable of dilating in the second zone for reducing the friction-increasing force with which the chips tend to press against internal walls of the flutes and an inner wall of a hole during drilling.

2. Drill according to claim 1 wherein the length of the first chip-forming zone, measured from the tip end, is 0.3-2.0 times the shank diameter.

3. Drill according to claim 1, wherein the length of the first, chip-forming zone measured from the top end is 0.5-1.5 times the shank diameter.

4. Drill according to claim 1, wherein the length of the first chip-forming zone measured from the tip end is approximately 0.8 times the diameter of the shank.

5. Drill according to claim 1, wherein the width of the flutes in the second zone is 5-25% larger than the width of the flutes in the first zone.

6. Drill according to claim 1, wherein the width of the flutes in the second zone is 10-20% larger than the width of the flutes in the first zone.

7. Drill according to claim 1, wherein the width of the flutes in the second zone is 5-25% larger than the width of the flutes in the first zone.

8. Drill comprising a substantially solid shank with a first, tip-forming end having one or more cutting edges for cutting or machining of workpieces for making holes in the workpieces, an opposite second end of the shank and a number of flutes corresponding to the number of cutting edges, said flutes extending from the tip end towards the other end, said flutes being provided for forming and conveying chips from the corresponding cutting edge, said flutes having a first, chip-forming zone extending for a predetermined length from the first end and having one of a predetermined width or cross-sectional area, a second, chip-conveying zone with one of a larger width or cross-sectional area than the first zone at the connection between the first and second zones, the flutes along at least a portion of the second zone having a width that decreases toward the rear end, the chips after being formed in the first zone being capable of dilating in the second zone for reducing the friction-increasing force with which the chips tend to press against internal walls of the flutes and an inner wall of a hole during drilling.

9. Drill according to claim 1, wherein the conveying zone is widened in relation with the chip-forming zone and extends from the connection between the first and second zones to a rear end of the flutes.

10. Drill according to claim 1, wherein the flutes along at least a portion of the second chip-conveying zone has a width that gradually decreases towards the rear end.

11. Drill according to claim 1, wherein the flutes in its first chip-forming zone have substantially the same width or cross-sectional area along substantially the whole length of the first zone.

12. Drill according to claim 1, wherein the flutes in the first zone have a short recess in the immediate proximity of the tip.

13. Drill according to claim 1, wherein along at least a rear portion of the first chip-forming zone, the flutes have a width that gradually decreases rearwards to form a passage with minimal width in the region of the connection between the first and second zones, said passage compressing the chips to an extraordinarily small volume before the chips are fed into the second conveying zone.

14. Drill according to claim 1, wherein the flutes, at least in the first, forming zone have an arc-like form in cross-section, said arc-like form having an arched, smooth surface that extends between outer edges on two adjacent lands between which each of the flutes is formed.

15. Drill according to claim 1, wherein the second chip-conveying zone of the flute is at least partially delimited by a surface in which longitudinal depressions or grooves are provided, between which ridges are formed, said ridges having the purpose of reducing the contact surface between the chips and a flute bottom.

16. Drill according to claim 1, wherein the flutes are helically formed with a uniform pitch angle within the range of 20°–40°.

17. Drill according to claim 1, wherein the shank is divided into a main part and a tip part, which is connectable with the main part, the cutting edges being provided on the tip part, the connection between the chip-forming zone and the chip-conveying zone in each flute being located in the region of the joint between said parts.

18. Drill comprising a substantially solid shank with a first, tip-forming end having one or more cutting edges for cutting or machining of workpieces for making holes in the workpieces, an opposite second end of the shank and a number of flutes corresponding to the number of cutting edges, said flutes extending from the tip end towards the other end, said flutes being provided for forming and conveying chips from the corresponding cutting edge, said flutes having a first, chip-forming zone extending for a predetermined length from the first end and having one or a predetermined width or cross-sectional area, a second, chip-conveying zone with one of a larger width or cross-sectional area than the first zone, the chips after being formed in the first zone being capable of dilating in the second zone for reducing the friction-increasing force with which the chips tend to press against internal walls of the flutes and an inner wall of a hole during drilling, along at least a rear portion of the first chip-forming zone, the flutes having a width that gradually decreases rearwards to form a passage with minimal width in the region of the connection between the first and second zones, said passage compressing the chips to an extraordinarily small volume before the chips are fed into the second conveying zone.

19. Drill comprising a substantially solid shank with a first, tip-forming end having one or more cutting edges for cutting or machining of workpieces for making holes in the workpieces, an opposite second end of the shank and a number of flutes corresponding to the number of cutting edges, said flutes extending from the tip end towards the other end, said flutes being provided for forming and conveying chips from the corresponding cutting edge, said flutes having a first, chip-forming zone extending for a predetermined length from the first end and having one of a predetermined width or cross-sectional area, a second, chip-conveying zone with one of a larger width or cross-sectional area than the first zone, the chips after being formed in the first zone being capable of dilating in the second zone for reducing the friction-increasing force with which the chips tend to press against internal walls of the flutes and an inner wall of a hole during drilling, the shank being divided into a main part and a tip part, which is connectable with the main part, the cutting edges being provided on the tip part, the connection between the chip-forming zone and the chip-conveying zone in each flute being located in the region of the joint between said main part and said tip part.

* * * * *